Patented Oct. 26, 1943

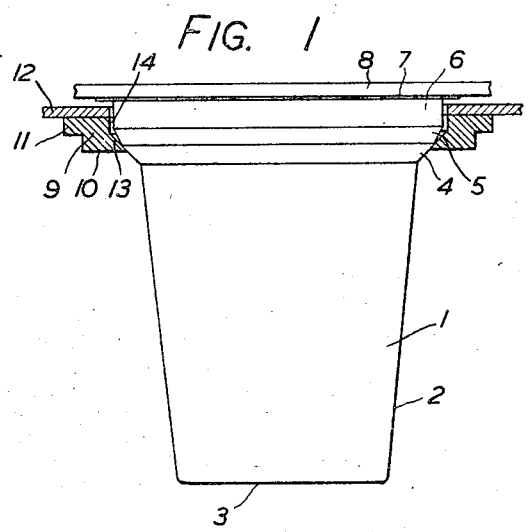
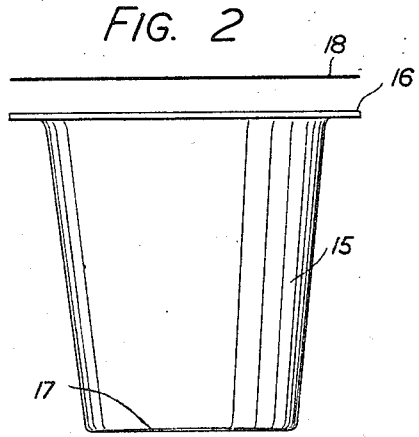
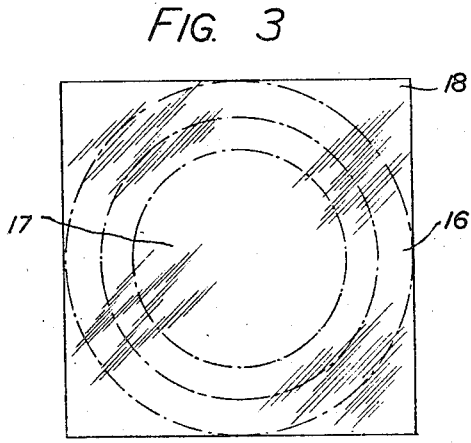

2,332,589

UNITED STATES PATENT OFFICE 2,332,589

CONTAINER AND ITS MANUFACTURE

William Henry Moss, London, England, assignor to Celanese Corporation of America, a corporation of Delaware Application May 21, 1940, Serial No. 336,335
In Great Britain June 13, 1939

3 Claims. (Cl. 18—58)

This invention relates to containers of film-forming materials such, for example, as cellulose acetate, and has as its principal object to provide a light container of such material adapted to be filled with milk or other perishable foodstuff, sealed to prevent the access of air, and delivered to the consumer in sealed form.

The containers of the invention are seamless, transparent and self-supporting. They are of cylindrical or near-cylindrical form, e. g., they may have the form of a cylinder of circular or elliptical base or, preferably, that of a truncated cone. They have very thin walls and bottom and are provided round the mouth with an outwardly extending flange substantially perpendicular to the axis, of considerably greater thickness than the walls. Thus, by way of example, the thickness of the walls may range from 0.002" or even less to 0.003", 0.004", 0.005" or even up to 0.007" or slightly more and the thickness of the flange may vary from 0.010" or even in the case of containers with very thin walls 0.005" or 0.015", 0.02" or 0.03" or even more. The thickness of the flange should be at least twice, and preferably three or four times that of the walls. Indeed the flange may with advantage be from five to ten times the thickness of the walls. The thickened flange adds greatly to the strength and rigidity of the container and enables containers to be made with very much thinner walls than would otherwise be practicable. This is of great advantage in reducing the weight of the container.

The containers may be made by any suitable method. One of the best methods comprises dipping a former provided with a stripping ring, the lower surface of which is perpendicular to the axis of the former, into a solution of the film-forming substance in a volatile solvent, removing the assembly of former and ring, and inverting it so that some of the film-forming solution runs down the sides and so forms the thickened flange on said perpendicular surface, and stripping the container from the former while turning said container inside out, by axial movement of the ring. The former is preferably made in the shape of a truncated cone, the stripping ring being provided at the broader end. This during dipping is the upper end and the assembly of former and ring are immersed in the solution until the lower, substantially horizontal surface of the ring is below the surface of the solution. The former is preferably removed slowly from the film-forming solution and allowed to drain for a short time before being inverted. In the inverted position the solution is allowed to dry substantially completely, preferably in an enclosed atmosphere. After drying the container may be removed from the former by axial movement of the ring past the narrow end of the former and this movement is effected in such a way as to turn the container inside out. Moreover, it is possible by removing at a rate which can readily be ascertained in any particular case by experiment to dish the bottom of the container inwards. This contributes to the strength and rigidity of the container. The use of a former in the shape of a truncated cone also enables the containers to be nested one within another which is of great advantage, not only in reducing the space taken up by the containers but in protecting them from damage during transit when empty. A suitable material for the former and ring when using a film-forming solution of cellulose acetate or like material is polished aluminium.

The accompanying drawings show by way of example one form of container according to the invention together with the former and stripping ring used in producing the container.

In the drawings

Fig. 1 shows in part-sectional elevation the former and stripping ring;

Fig. 2 shows in elevation a container made on said former and a cover therefor;

Fig. 3 is a plan view of the sealed container; and

Figure 4:
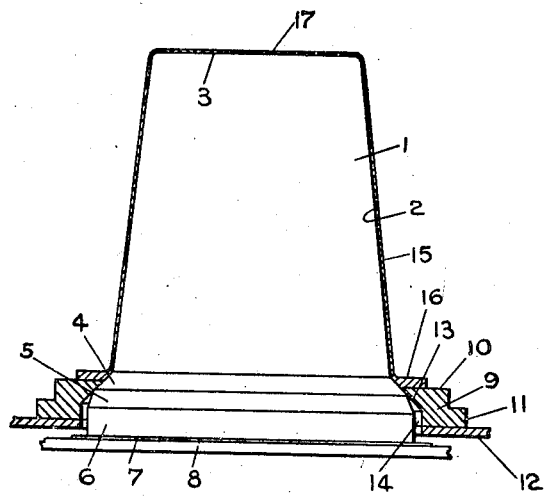
Fig. 4 shows in part-sectional elevation a former and stripping ring inverted with respect to the position shown in Fig. 1.

Referring to Fig. 1 the former 1 is a hollow body of aluminium finely polished on the outside and comprising a truncated-conical body-portion 2 closed at the lower end 3, a shoulder having two differently sloping surfaces 4 and 5, a cylindrical portion 6 and a flange 7. This flange is fixed to a support 8 located in a carrier (not shown) by movement of which the former can be lowered into the dipping bath, raised therefrom and inverted.

The stripping-ring 9, also of aluminium polished on the outside, has a lower surface 10 which is perpendicular to the axis of the former when the ring is in position, as shown in Fig. 1, the sloping surface 13 making contact with the sloping surface 4 of the former and an annular space being left at 14 between the ring and the former. The ring has an annular extension 11 fixed to a plate 12 which is attached to means (not shown) for moving the ring axially with respect to the former, said means being located in the carrier referred to.

Referring now to Fig. 2, the container shown has a thin wall 15 and slightly dished bottom 17 and an outwardly extending flange 16 perpendicular to the axis of the container and about ten times the thickness of the wall 15. The cover 18 is a square sheet of foil of the same kind of material as that of which the container is composed.

Fig. 3 shows the container of Fig. 2 sealed by adhesively uniting the cover 18 to the flange 16. The sealing is, of course, effected after the container has been filled with the foodstuff or other product which it is to hold.

Fig. 4 shows the container of Fig. 2 being formed, with the former 1 in inverted position and the flange 16 of the container resting on the surface 10 of the stripping ring 9.

In the production of the container, the former and ring, assembled as shown in Fig. 1, are dipped into a bath containing a suitable film-forming solution until the lower surface 10 of the ring is just below the surface of the solution. The assembly, carrying a coating of the film-forming solution, is then withdrawn slowly, e. g., during about four minutes, by movement of the carrier or of the bath and is inverted by a suitable movement of the carrier and the coating of film-forming substance on the former and ring is dried slowly, e. g., during four hours, in the inverted position as shown in Fig. 4. During drying, drainage of dope down the walls of the former on to the surface 10 occurs to produce the required thickening of the flange. The ring 9 is then moved axially past the narrow end of the former, so stripping the dried coating which constitutes the container from the former and at the same time turning the container inside out. By conducting this stripping operation at a suitable speed (which can readily be ascertained by trial in any particular case) the bottom of the container can be dished.

The following are examples of suitable film-forming solutions for use in the dipping bath, the parts being by weight:

Example 1

| | Parts |
|---|---|
| Cellulose acetate | 100 |
| Acetone | 400 to 500 |
| Dimethyl phthalate | 3 to 10 |

Example 2

The solution has the same composition as that of Example 1 except that triacetin is substituted for dimethyl phthalate.

Other plasticisers for the cellulose acetate may be employed, for example dimethoxyethyl phthalate, diethoxyethyl phthalate, methyl methoxyethyl phthalate and ethyl ethoxyethyl phthalate. Naturally, when the containers are intended to contain foodstuffs, the use of plasticisers which are toxic or apt to flavour the foodstuff must be avoided. It will be noted that the amount of plasticiser specified above is considerably less than that customarily employed in making foils, sheets and like materials of cellulose acetate. This low content of plasticiser gives the advantage of increased strength which is particularly important where the walls of the container are extremely thin. In general a content of about 5% on the weight of the cellulose acetate of a good plasticiser for cellulose acetate such as dimethyl phthalate gives excellent results. The plasticiser content, however, can be reduced to as little as 3% or can even be omitted. On the other hand, it can be increased even beyond 15% but a higher content than about 20% is undesirable.

An example of a suitable film-forming solution free from plasticiser is as follows:

Example 3

| | Parts |
|---|---|
| Cellulose acetate | 100 |
| Acetone | 400 to 500 |

For cellulose acetate, acetone is preferred as the volatile solvent of the film-forming composition. Other solvents, however, can be employed, for example dioxane and methylene ethylene ether. The film-forming composition may contain in addition to the volatile solvent a medium boiling solvent such as ethyl lactate or diacetone alcohol. In this case drying must be effected at an elevated temperature which is not essential when substantially the whole of the solvent is of low boiling point.

Instead of cellulose acetate other organic derivatives of cellulose can be employed, for example cellulose propionate, cellulose propionate-butyrate, cellulose acetate-nitrate, cellulose acetate-propionate, cellulose acetate-butyrate, and ethyl and benzyl celluloses. Alternatively, the film-forming composition may comprise a polyvinyl ester or ether or other similar film-forming polymerised unsaturated compound, for example polymethyl methacrylate. Containers of one film-forming substance made as described above may, if desired, be coated internally with another film-forming substance. Thus for example containers of cellulose acetate may be coated internally with polyvinyl acetate.

In use the containers of the invention can be filled with milk, preserved fruit, preserved meat products or other perishable articles which it is desired to preserve, and closed by sealing a cover, preferably in the form of a sheet of the same material as the container, to the flange of the container. This may be effected under heat and pressure, preferably with the aid of a suitable adhesive. For containers of cellulose acetate polyvinyl acetate is very suitable as an adhesive for attaching the cover to the flange of the container under heat and pressure.

Having described my invention, what I desire to secure by Letters Patent is:

1. Process for the production of a transparent, seamless, self-supporting, wide-mouthed container of cylindrical or near-cylindrical form, suitable for retail distribution of milk or other perishable foodstuff, being formed of artificial film-forming material and having a side wall of thickness from about 0.002″ to about 0.007″ and a flange at least twice as thick as the side wall extending outwardly from the mouth and substantially perpendicular to the axis of the container which comprises dipping a former round the upper part of which fits a stripping-ring into a bath containing a suitable solution, withdrawing the assembly of former and ring coated with said solution from the bath, inverting it, and drying the coating, the flange of the container being formed on what is in the dipping position the lower surface of the ring, said surface being perpendicular to the axis of the former, and the flange being thickened by gravity flow of the solution constituting the coating while the assembly is in the inverted position, and then stripping the dry, formed container from the former by turning said container inside out.

2. Process for the production of a transparent, seamless, self-supporting, wide-mouthed container of cylindrical or near-cylindrical form, suitable for retail distribution of milk or other perishable foodstuff, being formed of artificial film-forming material and having a side wall of thickness from about 0.002" to about 0.007" and a flange at least twice as thick as the side wall extending outwardly from the mouth and substantially perpendicular to the axis of the container which comprises dipping a former round the upper part of which fits a stripping-ring into a bath containing a solution of a lower organic ester of cellulose together with 3–10% on the weight of said ester of a plasticizer therefor, said ester and plasticizer being dissolved in a volatile liquid, withdrawing the assembly of former and ring coated with said solution from the bath, inverting it, and drying the coating, the flange of the container being formed on what is in the dipping position the lower surface of the ring, said surface being perpendicular to the axis of the former, and the flange being thickened by gravity flow of the solution constituting the coating while the assembly is in the inverted position, and then stripping the dry, formed container from the former by turning said container inside out.

3. Process for the production of a transparent, seamless, self-supporting, wide-mouthed container of cylindrical or near-cylindrical form, suitable for retail distribution of milk or other perishable foodstuff, being formed of artificial film-forming material and having a side wall of thickness from about 0.002" to about 0.007" and a flange at least twice as thick as the side wall extending outwardly from the mouth and substantially perpendicular to the axis of the container which comprises dipping a former round the upper part of which fits a stripping-ring into a bath containing a solution of cellulose acetate together with 3–10% on the weight of said ester of a plasticizer such as dimethyl phthalate or triacetin, said ester and plasticizer being dissolved in a volatile liquid, withdrawing the assembly of former and ring coated with said solution from the bath, inverting it, and drying the coating, the flange of the container being formed on what is in the dipping position the lower surface of the ring, said surface being perpendicular to the axis of the former, and the flange being thickened by gravity flow of the solution constituting the coating while the assembly is in the inverted position, and then stripping the dry, formed container from the former by turning said container inside out.

WILLIAM HENRY MOSS.